US006896270B1

(12) United States Patent
Sturman et al.

(10) Patent No.: US 6,896,270 B1
(45) Date of Patent: May 24, 2005

(54) SEALING DEVICE FOR A BEARING ARRANGEMENT

(75) Inventors: Graham Frederick Sturman, West Hunsbury (GB); Hans Unger, Absteinach (DE); Markus Schwerdtfeger, Mannheim (DE)

(73) Assignee: The Timken Company, Canton, OH (US)

( * ) Notice: Subject to any disclaimer, the term of this patent is extended or adjusted under 35 U.S.C. 154(b) by 151 days.

(21) Appl. No.: 10/089,966
(22) PCT Filed: Oct. 12, 2000
(86) PCT No.: PCT/GB00/03924
§ 371 (c)(1),
(2), (4) Date: Aug. 12, 2002
(87) PCT Pub. No.: WO01/27484
PCT Pub. Date: Apr. 19, 2001

(51) Int. Cl.[7] ............................................. F16J 15/32
(52) U.S. Cl. ...................... 277/572; 277/460; 384/484; 384/485
(58) Field of Search ................... 277/549, 551, 277/560, 572, 573, 574, 586; 384/484, 485, 486

(56) References Cited

U.S. PATENT DOCUMENTS

| | | | |
|---|---|---|---|
| 4,376,541 A | * | 3/1983 | Walter et al. ................. 277/353 |
| 4,692,040 A | | 9/1987 | Ebaugh et al. |
| 4,702,626 A | | 10/1987 | Scholl et al. |
| 4,806,026 A | * | 2/1989 | Bauer et al. ................. 384/486 |
| 4,865,468 A | | 9/1989 | Kato et al. |
| 4,865,472 A | | 9/1989 | Jacob |
| 5,431,413 A | * | 7/1995 | Hajzler ........................ 277/317 |
| 5,492,419 A | | 2/1996 | Miller et al. |
| 5,530,344 A | * | 6/1996 | Caillaut et al. .............. 324/174 |
| 5,553,870 A | | 9/1996 | Czekansky et al. |
| 6,065,879 A | * | 5/2000 | Mitsue et al. ................ 384/448 |

FOREIGN PATENT DOCUMENTS

| | | |
|---|---|---|
| DE | 4222852 A1 | 1/1994 |
| EP | 0572734 A1 | 12/1993 |
| WO | WO9742425 | 11/1997 |

* cited by examiner

Primary Examiner—Anthony Knight
Assistant Examiner—E Peavey
(74) Attorney, Agent, or Firm—Polster, Lieder, Woodruff & Lucchesi, L.C.

(57) ABSTRACT

There is provided a sealing device (10) for a unitised grease-or oil-lubricated package bearing assembly comprising a twin outer race (14) and two inner races (15, 16) arranged next to each other on a shaft (12), with their faces abutting. Typically, oil may be present between the said shaft (12) and the bore surfaces of the bearing inner races (15, 16), for the purpose of lubricating parts of the system adjacent to the bearing, but not the sealed, lubricated bearing itself. The sealing device comprises a substantially annular sealing portion (26) and the provision of a step (29) in the abutting face of one of the inner races such that a substantially rectangular-section groove (30) is created on the outside diameter of the abutting inner races (15, 16). Located in the groove (30) is the annular sealing portion (26) of the annular sealing device (10) which is compressed between the side walls of the groove (30) to provide a barrier to (a) ingress of any oil or water present between the shaft (12) and the bores of the inner race assemblies (15, 16), (b) loss of oil which is part of the lubricant sealed within the bearing.

22 Claims, 5 Drawing Sheets

Figure 1:
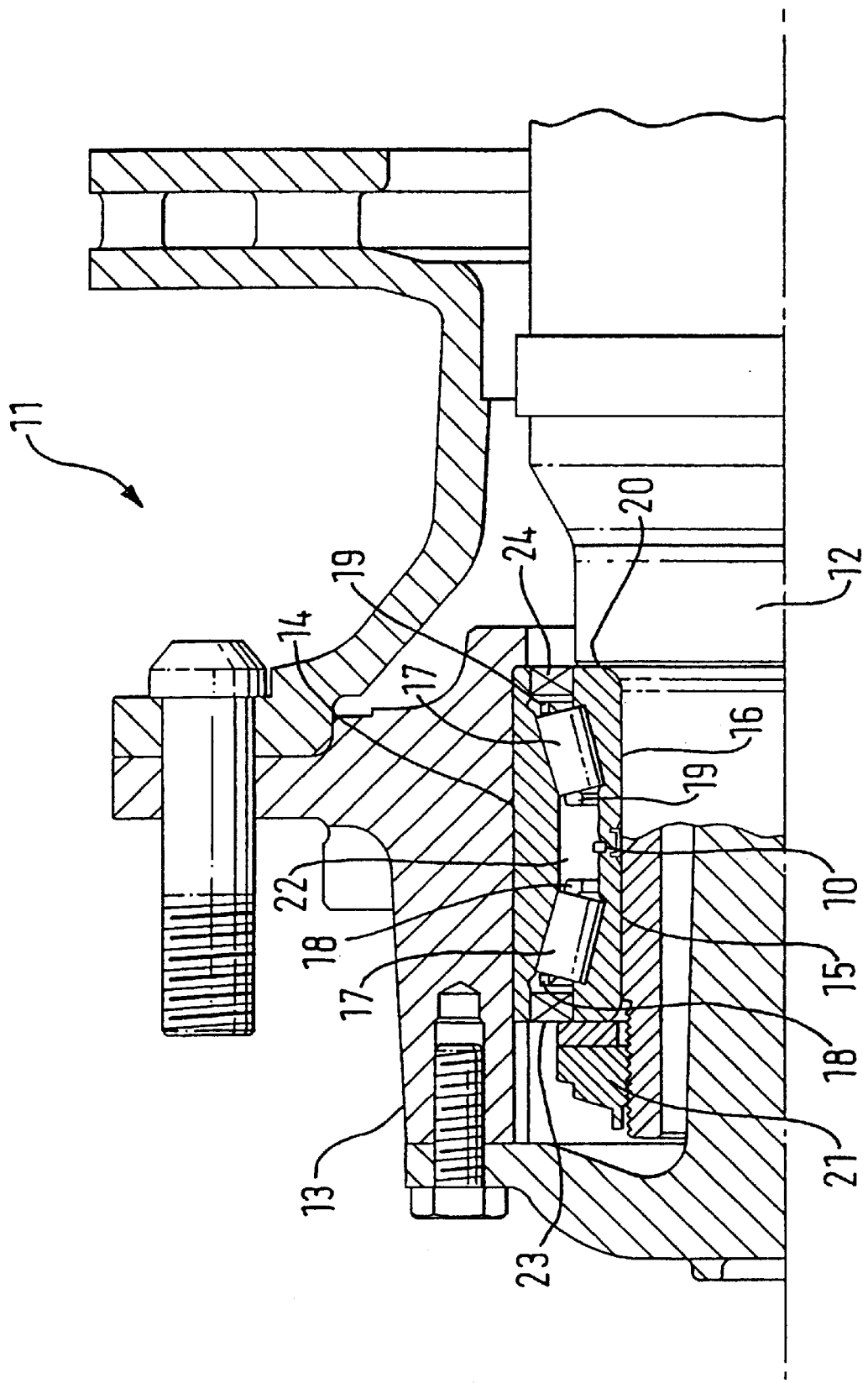

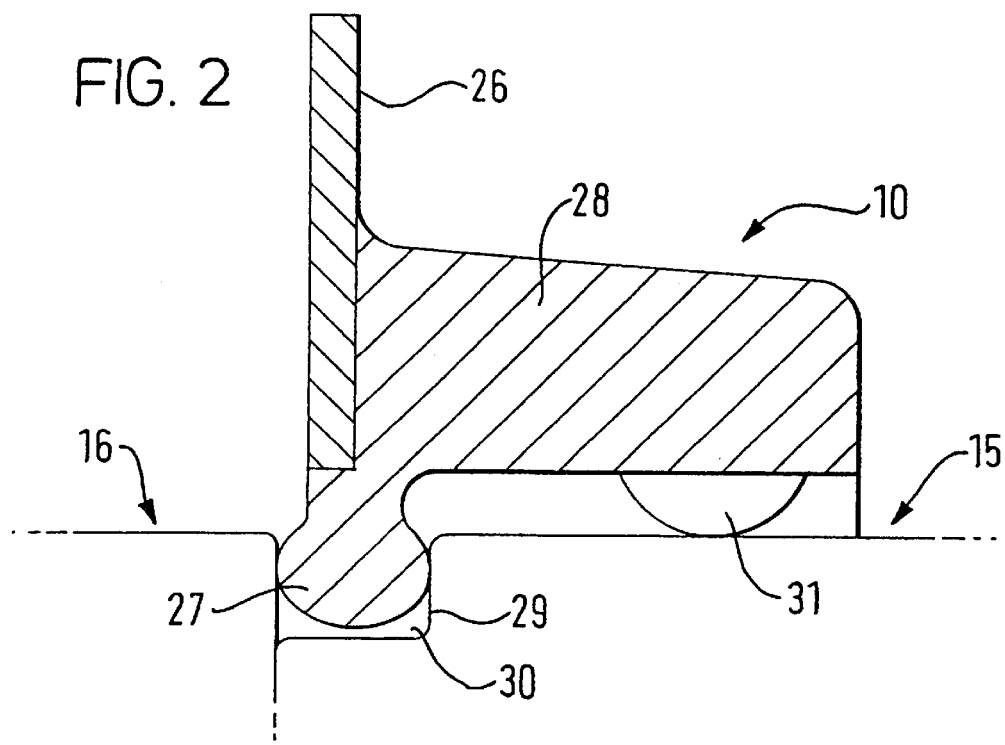
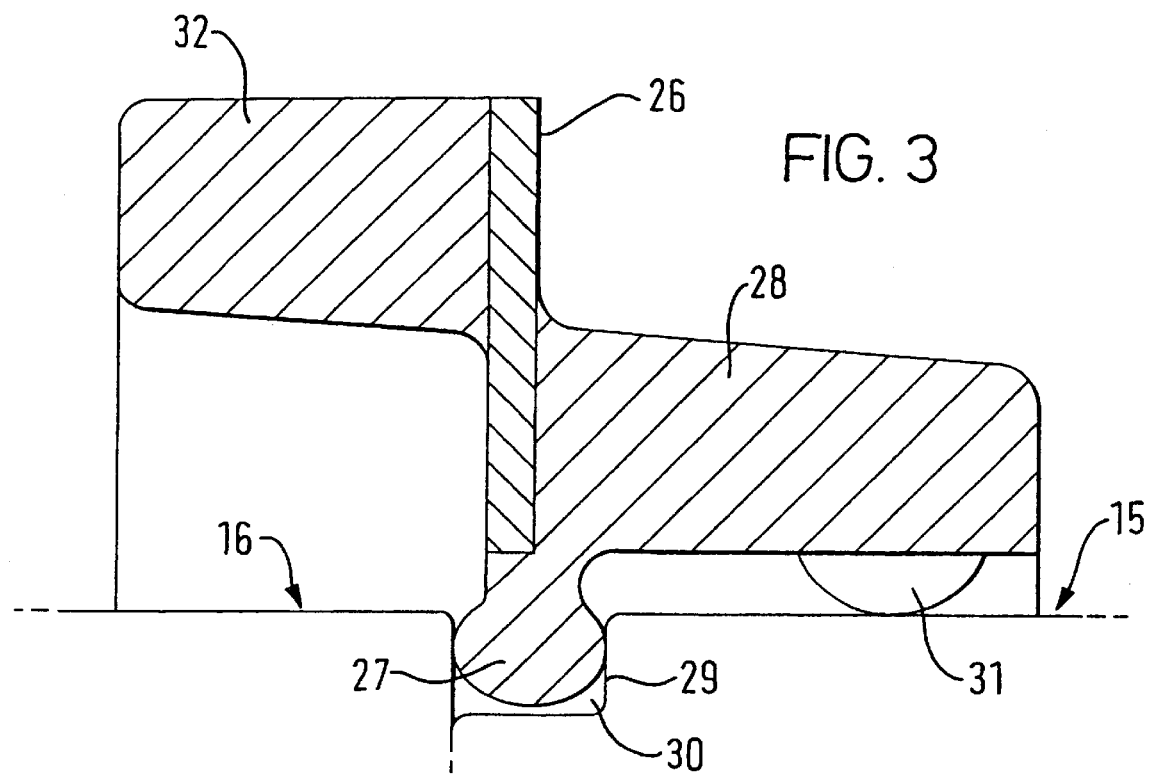

VIEW ON 'A'

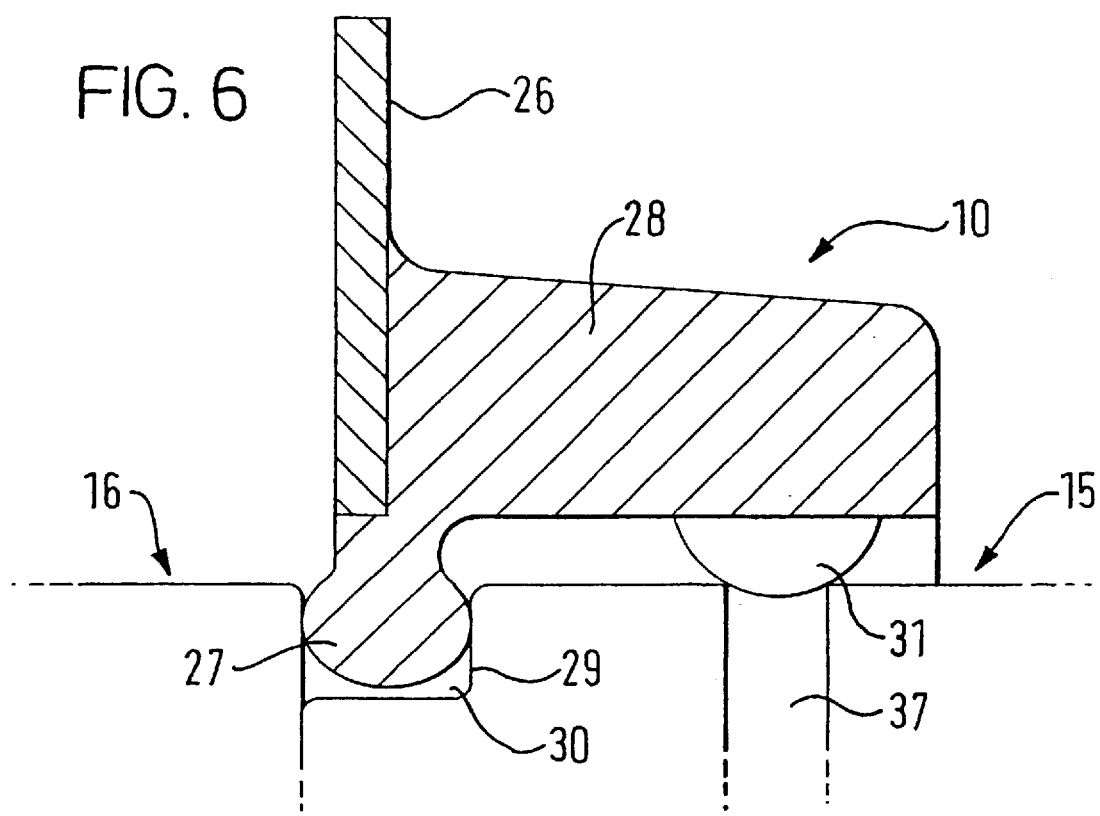
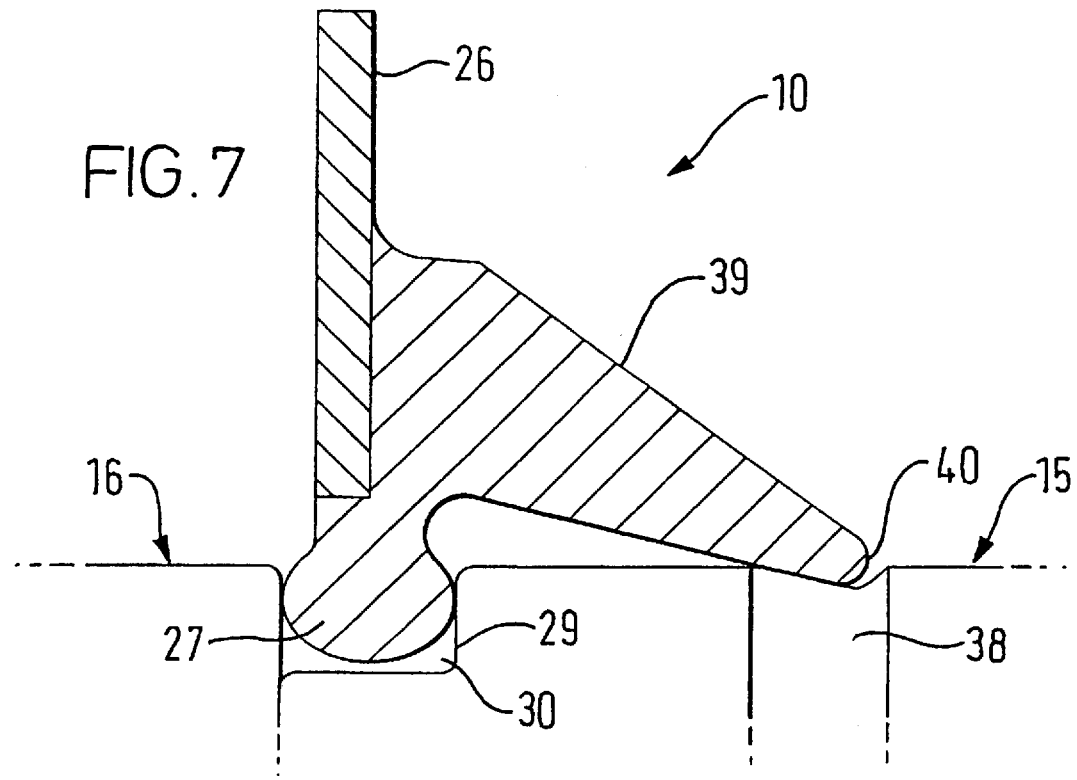

SEALING DEVICE FOR A BEARING ARRANGEMENT

The invention relates to a sealing device for a bearing arrangement, particularly but not exclusively unitised bearing assemblies for, typically, wheel hubs and drive pinions of road vehicles. Such bearing assemblies generally comprise a pair of inner bearing assemblies mounted on a shaft, each inner bearing assembly having an inner race abutting the inner race of the other inner bearing assembly with lubricating oil being present between the shaft and the inner races.

There are many types of bearing arrangements available for supporting the wheels relative to the wheel axles of motor vehicles. With trucks and other heavy vehicles it is very common for the rear wheels in particular to be supported in unitised bearing arrangements comprising a pair of roller bearing assemblies mounted next to each other on a shaft. The bearing arrangement generally incorporates a charge of lubricating grease which is retained in the cavity between the pair of bearing assemblies by means of end seals. Each roller bearing assembly includes an outer race, an inner race and a set of rollers disposed therebetween. In use a thin layer of oil generally migrates between the shaft and the inner surfaces of the inner races, the oil being provided in the axle arrangement for lubricating other parts of the rear axle drive assembly.

It is desirable that the oil does not enter the inside of the bearing assembly as it can have a detrimental effect on the grease present in the cavity between the pair of bearing assemblies. In addition small amounts of water can be present in the small radial clearance between the shaft and the inner races and it is desirable to prevent this water from entering into the grease cavity.

According to the present invention there is provided a sealing device for a bearing assembly comprising a pair of inner bearing assemblies, each with an inner race arranged next to the other inner race on a shaft so that the end faces of the inner races abut, whereby oil which is present between said shaft and the radially inner surfaces of the inner races facing the shaft is prevented from entering between the abutting end faces of the inner races by means of the sealing device which is constituted by a substantially annular member having an annular sealing portion adapted to be compressively retained in a groove constituted by a step formed in at least one of the inner races in the radially outermost region of the axial end face of said one inner race where it abuts the other inner race.

In preferred arrangements the device comprises means for retention in position on one of the inner races prior to assembly of the bearing. Preferably said retention means comprises an axially extending sleeve portion for mounting along a surface of said one inner race. It is a preferred feature that said sleeve portion incorporates a number of radially extending projections on its inner surface for an interference fit on said surface of said one inner race.

Conveniently said sealing device comprises an annular insert with an elastomeric material moulded on to it to provide said annular sealing portion and said sleeve portion. Ideally said annular insert is substantially rigid and is preferably made of steel. In one preferred embodiment said annular insert extends in a substantially radial plane.

With some chosen arrangements a second sleeve portion is disposed radially outwards relative to the first sleeve portion and extends in the opposite axial direction. Ideally the radially outer surface of said first sleeve portion is shaped and dimensioned so as to be nestable within the second sleeve portion of another sealing device. In a further preferred embodiment, additional interrupted formations are provided at regular angular intervals around its circumference for interaction with a sensing device which may be used to determine the rotational speed of the shaft.

According to the present invention there is also provided a bearing arrangement comprising a pair of inner bearing assemblies, each with an inner race arranged next to the other inner race on a shaft so that the end faces of the inner races abut and a sealing device as described above.

Figure 4:
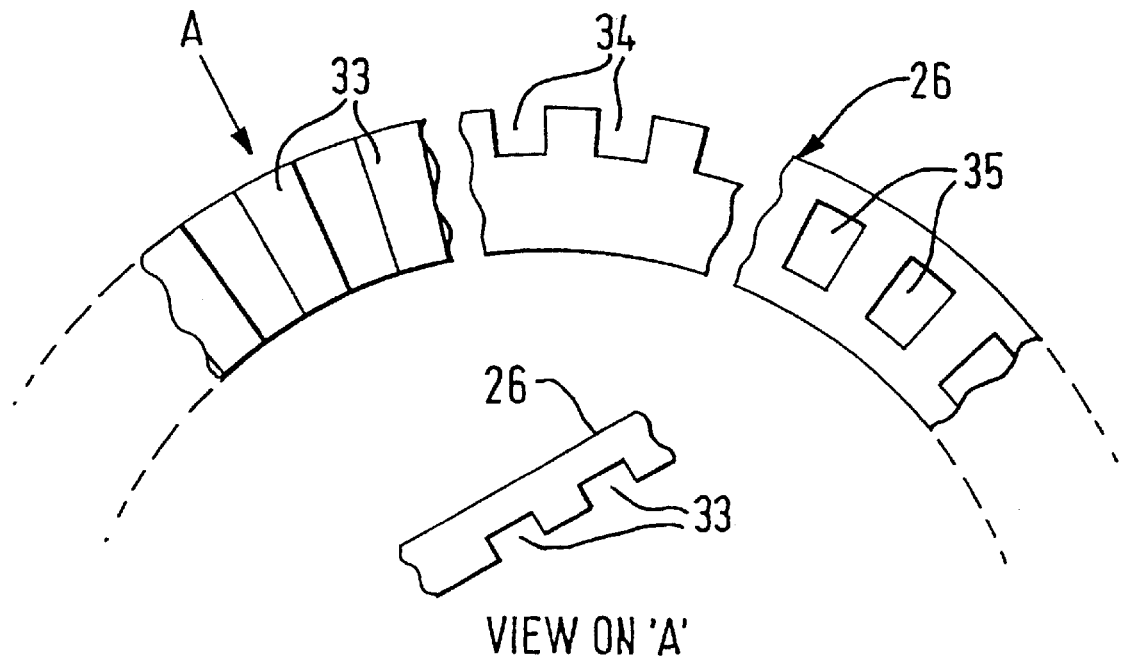
Figure 5:
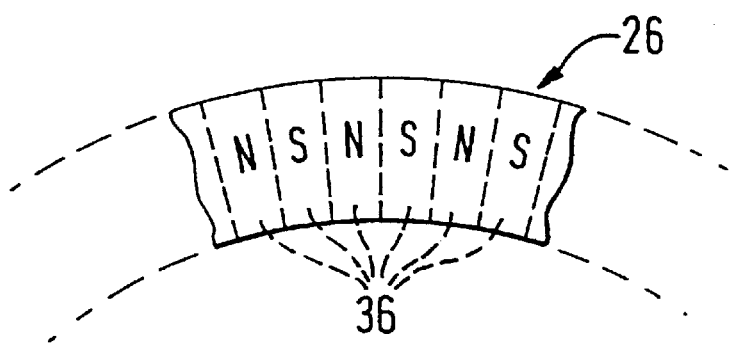

Embodiments of the invention will now be described in more detail. The description makes reference to the accompanying drawings in which:

FIG. 1 is a partial lengthwise section through an axle arrangement incorporating a sealing device according to the present invention, FIG. 2 is a section through the sealing device incorporated in the FIG. 1 arrangement on a larger scale, FIG. 3 is a section similar to FIG. 2 through an alternative sealing device according to the present invention, FIG. 4 is a partial end view of the sealing device shown in FIG. 3 showing three possible arrangements, FIG. 5 is a partial end view of the sealing device of FIG. 3 showing a further alternative arrangement.

Figure 8:
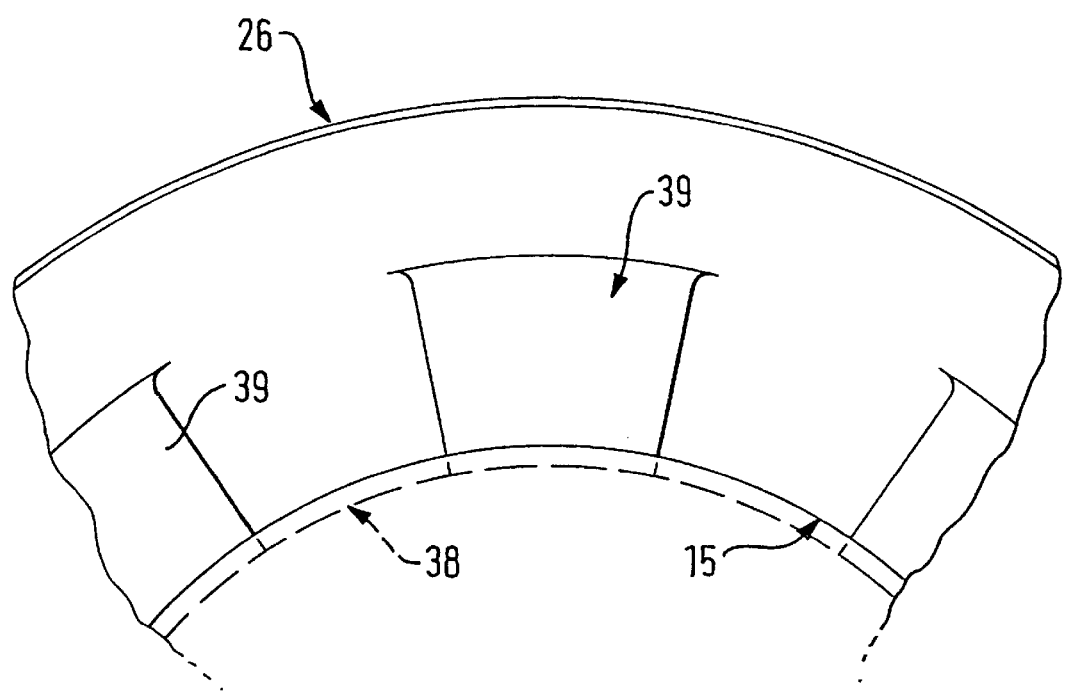

FIG. 6 is a section similar to FIG. 2 through another alternative sealing device according to the present invention, FIG. 7 is a section similar to FIG. 2 through a further alternative sealing device according to the present invention, and FIG. 8 is an axial end view of the FIG. 7 device.

FIGS. 1 and 2 show a sealing device 10 incorporated in a unitised bearing arrangement 11 which is arranged on a rear axle shaft 12 of a motor vehicle, perhaps a heavy commercial vehicle. A wheel centre 13 for at least one wheel is mounted on shaft 12 by means of the unitised roller arrangement 11 which comprises an outer race 14 and a pair of radially inner races 15, 16. The outer race 14 is shown as a twin outer a race but it will be appreciated that the outer race 14 could comprise a pair of adjacent single races. Between the outer race 14 and the two inner races 15, 16 are sets of rollers 17 which are held captive in cages 18, 19. The radially inner races 15, 16 are mounted next to each other on the shaft 12 with their adjacent axial end faces in abutment. After assembly of the bearing arrangement the inner races 15, 16 are held together and against an abutment shoulders 20 formed on the shaft 12 by means of a nut 21 threadedly mounted on the outermost end of the axle 12.

Internally of the bearing arrangement is a cavity 22, which in uses contains a charge of grease or oil intended for lubrication of the roller bearings. As mentioned in the introduction, a thin layer of axle lubricating oil generally migrates into the small radial clearance between the shaft 12 and the inner surfaces of the inner races 15, 16, the oil being provided in the axle arrangement for lubricating other parts of the rear axle drive assembly (not shown). This axle lubricating oil is often contaminated with metallic or other debris. End seals 23, 24 are provided to prevent loss of grease or oil from the cavity 22 and prevent axle lubricating oil from entering the cavity 22. The end seals 23, 24 also prevent water and other contaminants from entering the cavity 22.

It is of course desirable to prevent the axle lubricating oil from passing between the abutting end faces of the inner races 15, 16 and into the cavity 22 where it can adversely affect the effectiveness of the roller bearing lubrication. Similarly it is desirable to prevent the roller bearing lubrication from exiting the cavity 22 by way of abutting axial end faces of the inner races 15, 16. There is also the need to prevent water from entering the cavity 22 via the abutting end faces of the inner races 15, 16. Any contaminations as described above can lead to inefficient bearing action and possibly premature failure.

For these reasons the sealing device 10 is arranged in the vicinity of the abutting axial end faces of the two inner races 15, 16. The sealing device 10, which is shown in more detail in FIG. 2, comprises a substantially annular member having an annular insert 26 which is preferably made of steel or another substantially rigid material, on to which an elastomeric material, or other suitable sealing material, is integrally moulded so as to cover both faces, and also its internal and external diameters. The insert 26 is generally planar in a radial direction and the elastomeric material provides an annular sealing portion 27 and an axially extending annular sleeve portion 28.

Again with reference to FIG. 2, it will be seen that the axial end face of one of the abutting inner races 15 is machined so as to form a step 29 at the intersection of its face and outside diameter. The shape and dimensions of the step 29 are such that, when the axial end faces of the inner races 15, 16 abut each other, a rectangular section groove 30 is formed. The groove 30 has an axial width less than the free axial thickness of the sealing portion 27 of the sealing device 10, such that the elastomeric material on its axially opposing faces is compressed sufficiently to form an effective seal against the passage of oil into or from the cavity 22 when the two inner races are held in abutment.

The internal surface of the sleeve portion 28 of the sealing device 10 is formed with a number of circumferentially equally spaced projections 31. The sleeve portion 28 is designed so that it will fit over the external diameter of the inner race 15, adjacent its abutting axial end face, with the internal projections 31 having an interference fit with this external diameter. Thus, the sleeve portion 28 provides a means of locating and retaining the sealing device on the inner race 15 during the installation and assembly process and until such time as the sealing device 10 becomes captured in the groove 30 formed when the axial end faces of the inner races 15, 16 abut each other.

A further optional embodiment of the sealing device 10 is shown in FIGS. 3 and 4. In addition to the sleeve portion 28 moulded on to the insert 26 there is provided a second sleeve portion 32 on the opposite axial face of the insert 26. The second sleeve portion 32 is also radially spaced from the sleeve portion 28 and is shaped and dimensioned so as to accommodate the sleeve portion 28 of another identical sealing device 10 stacked alongside. The presence of this second sleeve portion 32 opposing the sleeve portion 28 in an adjacent sealing device, will facilitate the nesting of sealing devices 10 in a manner which will aid the stacking and dispensing of the sealing devices 10 by automated handling systems used in the installation of the sealing devices 10 as part of the assembly of the unitised bearings.

The arrangement shown in FIG. 6 is similar in many respects to that shown in FIG. 2 and so like features have been given like reference numerals. However, in FIG. 6, the inner race 15 is formed on its outside diameter with a shallow annular groove 37 of arcuate cross-section. During assembly of the bearing assembly, the groove 37 enhances the retention function of the internal projections 31 in the sleeve portion 28 of the elastomeric moulding and improves the positioning of the sealing device on the inner race 15.

In FIGS. 7 and 8 there are many similarities with the previous arrangements and like features have been given like reference numerals. However, in FIGS. 7 and 8 there is a shallow annular groove 38 with a tapered cross-section formed in the outside diameter of the inner race 15. Also, the resilient sleeve portion 28 of the sealing device 10 has a number of axially extending fingers 39 which are equally spaced around the circumference of the inner race 15. The ends 40 of the fingers 39 remote from the insert 26 are received in the groove 38 to retain and position the sealing device with respect to the inner race 15.

It will be appreciated that the fingers 39 could also be in the form of a continuous annular member, the axially remote end of which is received in the groove 38. In addition the projections 31 could be formed on axially extending fingers.

The invention is not limited to use on rear axles of motor vehicles, but may also be utilised on other types of shafts which comprise unitised grease -or oil-lubricated bearings which are arranged in environments with contaminated fluids external to the sealed and lubricated anti-friction bearings.

In such other applications, where the inner races of the bearing rotate inside a stationary outer race (the converse of the application to rear axles of motor vehicles previously described), and where there is a need to sense the speed of rotation of the axle supported on the bearing assembly, a further enhancement may be added to the sealing device. Because the sealing device 10 will rotate at the same speed as the bearing inner races 15, 16 between which it is positioned, the construction of the sealing device 10 may incorporate features in the form of either regularly spaced physical circumferential interruptions such as axial teeth 33 or radial teeth 34 or through openings 35, as shown in FIG. 4 for convenience, in the metal annular insert 26, or other regularly spaced features such as zones of alternating magnetic polarity 36 around the circumference of the sealing device 10. These regularly spaced features may act in conjunction with a suitable sensing device fixed within the cavity 22, and arranged in close proximity to the sealing device 10, such that the characteristic of the output signal from the sensing device may be used to determine the speed of rotation of the shaft supported by the bearing.

What is claimed is:

1. A sealing device for a bearing assembly comprising a pair of inner bearing assemblies, each with an inner race arranged next to the other inner race on a shaft so that the end faces of the inner races abut, the sealing device preventing oil which is present between said shaft and the radially inner surfaces of the inner races facing the shaft from entering the bearing assembly between the abutting end faces of the inner races, the sealing device comprising: a substantially annular member having an annular sealing portion adapted to be compressively retained in a groove constituted by a step formed in at least one of the inner races in the radially outermost region of the axial end face of said one inner race where it abuts the other inner race; and retention means for retention of the sealing device in position on one of the inner races prior to assembly of the bearing assembly, said retention means comprising an axially extending sleeve portion for mounting along a surface of said one inner race, said sleeve portion incorporating a number of radially extending projections on its inner surface for an interference fit on said surface of said one inner race or for engagement in a groove in said one inner race.

2. A sealing device as claimed in claim 1 wherein said sealing device comprises an annular insert with an elastomeric material molded on to it to provide said annular sealing portion and said sleeve portion.

3. A sealing device as claimed in claim 2 wherein said annular insert is substantially rigid.

4. A sealing device as claimed in claim 3 wherein said annular insert is made of steel.

5. A sealing device as claimed in claim 3 wherein said annular insert is elongate in a substantially radial plane.

6. A sealing device as claimed in claim 2 wherein a second sleeve portion is disposed radially outwards relative to the first portion and extends in the opposite axial direction.

7. A sealing device as claimed in claim 6 wherein the radially outer surface of said first sleeve portion is shaped and dimensioned so as to be nestable within the second sleeve portion of another sealing device.

8. A bearing arrangement comprising:

an outer race;

first and second inner races located in the outer race and having end faces which are presented toward each other, at least one of the inner races having a groove which opens radially out of the race and axially out of the end face on the race;

rolling elements arranged in two rows between the inner and outer races, with one row being between the first inner race and the outer race and the other row being between the second inner race and the outer race; and a sealing device for preventing contaminants from entering the space between the inner races and the outer race, the sealing device including an annular sealing portion formed from an elastomeric material, the sealing portion being located in the groove where it is compressed between the inner races to effect a seal between the inner races at their end faces, the sealing device also having an axially directed portion which is formed from an elastomeric material and fits around and grips the first inner race such that it will retain the sealing device on the first inner race in the absence of the second inner race.

9. A bearing arrangement according to claim 8 wherein the axially directed portion has inwardly directed projections and bears against the first inner race at the projections.

10. A bearing arrangement according to claim 8 wherein the axially directed portion has axially directed fingers.

11. A bearing arrangement according to claim 8 wherein the inner races abut at their and faces.

12. A bearing arrangement according to claim 8 wherein the sealing portion and the axially directed portion are joined together as an integral molding.

13. A bearing arrangement according to claim 12 wherein the sealing device also includes a rigid insert; and wherein the sealing portion and axially directed portion are attached to the insert.

14. A bearing arrangement according to claim 8 wherein the axially directed portion is in the form of a sleeve.

15. A bearing arrangement according to claim 8 wherein the sealing device has another axially directed portion that projects away from the axially directed portion that fits around the first race and is large enough to receive an axially directed portion similar in size and shape to the axially directed portion of the sealing device, so that like sealing devices may be stacked on a nested condition.

16. A bearing arrangement according to claim 8 wherein the first race has a groove which opens outwardly toward the outer race and spaced axially from the end face of the first race; and wherein the axially directed portion of the sealing device engages the first race at the groove.

17. A bearing arrangement according to claim 16 wherein the two grooves are in the first race.

18. A bearing arrangement according to claim 8 wherein the groove is in the first race.

19. A bearing arrangement according to claim 8 wherein the groove that opens out of the end face is in the first race only.

20. A bearing arrangement according to claim 8 wherein the sealing device includes a rigid insert to which the sealing portion and the axially directed portion are attached, and the insert has features which are capable of exciting a sensing device to reflect the annular velocity of the inner races.

21. A bearing arrangement comprising:

an outer race;

first and second inner races located in the outer race and having end faces which are presented toward each other, at least one of the inner races having a groove which opens radially out of the race and axially out of the end face on the race;

rolling elements arranged in two rows between the inner and outer races, with one row being between the first inner race and the outer race and the other row being between the second inner race and the outer race; and a sealing device for preventing contaminants from entering the space between the inner races and the outer race, the sealing device including, a rigid insert surrounding at least one of the inner races, the sealing device also including an annular sealing portion carried by the insert and formed from an elastomeric material, and the sealing portion being located in the groove where it is compressed axially between the inner races to effect a seal between the inner races at their end faces, the sealing device further including an annular sleeve portion which is formed from an elastomeric material, the sleeve portion being attached to the insert to fit around and grip the first inner race such that it will retain the sealing device on the first inner race in the absence of the second inner race.

22. A bearing arrangement according to claim 21 wherein the inner races abut at their end faces.

* * * * *